United States Patent [19]
MacFarlane

[11] Patent Number: 5,801,666
[45] Date of Patent: Sep. 1, 1998

US005801666A

[54] THREE-DIMENSIONAL MONITOR

[75] Inventor: Duncan L. MacFarlane, Dallas, Tex.

[73] Assignee: Board of Regents, The University of Texas System, Austin, Tex.

[21] Appl. No.: 4,734

[22] Filed: Feb. 10, 1993

[51] Int. Cl.$^6$ .................................................. G09G 5/00
[52] U.S. Cl. ........................................................... 345/6
[58] Field of Search ................................ 345/6, 5, 4, 139, 345/204; 340/815.42, 815.43; 359/51; 352/86; 385/116, 70, 144, 901; 40/547; 358/901

[56] References Cited

U.S. PATENT DOCUMENTS

| 4,134,104 | 1/1979 | Karras ................................ 345/6 |
| 4,299,447 | 11/1981 | Soltan et al. ..................... 340/815.42 |
| 4,525,711 | 6/1985 | Gery .................................. 340/815.42 |
| 4,758,896 | 7/1988 | Ito .......................................... 345/204 |
| 4,810,063 | 3/1989 | Fergason ........................... 359/51 |
| 4,817,434 | 4/1989 | Anderson . |
| 4,883,338 | 11/1989 | Abe et al. ........................... 385/144 |
| 4,987,554 | 1/1991 | Kaufman . |
| 5,024,521 | 6/1991 | Zuchowski et al. ............... 352/86 |
| 5,038,302 | 8/1991 | Kaufman . |
| 5,082,378 | 1/1992 | Müller et al. ...................... 385/70 |
| 5,293,437 | 3/1994 | Nixon ................................. 385/116 |

FOREIGN PATENT DOCUMENTS 2856035  7/1980  Germany .

OTHER PUBLICATIONS

"State of the Art Advanced Graphics," *Byte*, 250–254, Dec. 1990.
Upstill, "Graphics Go 3–D, State of the Art Advanced Graphics," *Byte*, 253–258, Dec. 1990.
Williams & Garcia, "Seeing the World in 3D," *University News*, 1–6, 1990 winter month?.
Loveria, "Low–Cost 3–D animation Materializes for PC Users," *Byte*, 259–262, Apr. 1991.
Sprott, "Simple Programs Create 3–D Images," *Computers in Physics*, 4(2):132–138, 1992, Mar./Apr.
Stix, "Desktop Artisans, Personal manufacturing weds design with part fabrication," *Scientific American*, 141–142, Apr. 1992.
Applications, *Photonics Spectra*, 118, Aug. 1992.
Pope, "The Beam in Your Eye," *Discover*, 26, Sep. 1992.
Abstract, Jack Fajans, *SPIE* vol. 1668, Visual Data Interpretation, month ? 1992.

Primary Examiner—Curtis Kuntz
Assistant Examiner—Vivian Chang
Attorney, Agent, or Firm—Arnold, White & Durkee

[57] ABSTRACT

A three-dimensional computer monitor is provided for displaying information and representations of objects in three dimensions. In a preferred embodiment, the monitor comprises a three dimensional array of optical voxels that are individually activated by energy transmitted through optical fibers coupled to each voxel. The energy, such as visible or ultraviolet light, may be conducted into selected optical fibers using a two dimensional shutter array or a plurality of controllable energy sources, under the direction of a digital computer. The voxels may be made of polymethylmethacrylate doped with a dye that fluoresces when energy, such as ultraviolet light, is introduced into a voxel. A color monitor may be constructed by selecting a plurality of dyes to produce voxels that emit different colors. The intensity of each of, for example, adjacent red, green and blue voxels can be controlled to produce a variety of colors.

42 Claims, 3 Drawing Sheets

THREE-DIMENSIONAL MONITOR

BACKGROUND OF THE INVENTION

The present invention, in a broad aspect, relates to visual display systems. In particular, it relates to a three-dimensional array of elements and a three-dimensional monitor system that produces three-dimensional visible images.

The presentation and visualization of three (or higher) dimensional information is a general problem which has achieved considerable attention, particularly from the computer industry. Many attempts have been made to display three-dimensional information on an inherently two-dimensional video screen or display monitor. In currently available software products, sophisticated and computationally intensive ray tracing algorithms, projection algorithms, hidden line removal algorithms, and rotation algorithms allow a three-dimensional rendering of an object on a two-dimensional surface. However, these systems still display the three-dimensional information on a two-dimensional monitor. It is often desirable to display information on a truly three-dimensional monitor.

Anaglyphic and stereoscopic techniques have also been used to simulate a three-dimensional environment. These techniques are a low-cost approach to three-dimensional visualization. Color or state-of-polarization coding, in conjunction with familiar "3D" red/blue viewer glasses, is used to simulate a three-dimensional image. However, the resulting image is usually mono-chromatic and is not compatible with multi-person tasks or off-angle viewing. That is, they do not actually permit the viewer to observe the sides and back of the object being displayed.

Three-dimensional visualization is also being attempted through digital or computer generated holograms that use digital signal processing techniques to perform an inverse diffraction calculation to simulate a holographic image of a device which typically does not exist. Computer generated holograms are typically displayed on two-dimensional plotters, computer screens, or laser scanners, but recent work has used tellurium oxide crystals as a display medium.

Three-dimensional information is also being displayed in fundamentally two-dimensional systems which go beyond the standard two-dimensional screen. Virtual reality, for example, seeks to wrap an artificial two-dimensional display around a person such that a three-dimensional environment is simulated using perspective, relative size, and masking. Another known system provides a true three-dimensional display by projecting a laser on a spinning plane of plexiglass. While these devices may be viewed from nearly a full solid angle, (i.e., from almost any direction) with a depth of approximately four inches, the computer address architecture is inherently serial, and this places a severe limitation on the amount of information that may be displayed and hence places a severe limitation on the degree of realism that may be obtained. Rotating lenses and vibrating mirrors have also been used in conjunction with cathode ray tubes to give an illusion of depth to a stream of dots. Here again, this example of a multiplanar display suffers from an inherently serial architecture. In addition, computer aided model making is a technique for reducing three-dimensional designs to permanent plastic sculpture form. This method has also been extended to using ink jet technology with ceramics and metals.

At the present time, there is a need for a display system that more effectively displays information, especially computer generated information, in three-dimensions. There is a more particular need for a system to display large amounts of three dimensional or higher-order information more completely and accurately. Such a system would have many uses in medical imaging, computer aided designing, and other information projection applications. For example, improved three dimensional monitors would be particularly useful in molecular modeling, mathematical surface displays, computer aided design of three dimensional mechanical or electromagnetic systems, architectural layout, tomographic imaging, surgical planning, human vision testing, radar and sonar display, entertainment applications and many other applications.

SUMMARY OF THE INVENTION

The present invention in a broad aspect comprises a three dimensional display system based on physical elements which are essentially transparent and emit or otherwise display light in response to electromagnetic signals. The physical elements, referred to as "optical voxels" /or simply "voxels", are arranged in a three-dimensional, essentially transparent array, wherein the individual elements or voxels are rendered visually active in response to their reception of ultraviolet light or other suitable forms of electromagnetic energy. Thus, in one preferred form, each optical voxel in a three-dimensional array of such voxels may be connected to a source of light by means of a transmitting conductor, which may be an optical fiber or other suitable wave guide. The connectors for any given array may be of a size and position within the array so as not to detract materially from the generally transparent nature of the array. Thus, a person viewing the array should be able to experience an actual three-dimensional effect in receiving light and colors originating throughout the array without substantial distraction or interference caused by the connectors. This may be accomplished in a number of ways. In very large scale systems it is possible to mask the effects of the connectors by making them sufficiently small. In general, the best method of hiding the connectors is by using an index matching fluid to eliminate the Fresnel reflections which ordinarily make the connectors visible.

In one general aspect of the invention the individual optical voxels comprise materials which are substantially transparent when not energized in accordance with the invention, but which emit light or change color when so energized. Thus, in a more particular aspect of the invention, the voxels may comprise spheres or polyhedrons of a clear, synthetic resin such as polymethylmethacrylate (PMMA) containing a clear dye which takes on a color when energized by a beam or stream of light. The energized dye reverts to its clear state when de-energized.

A three-dimensional array of the voxels may be formed by packing the voxels together and filling interstices between the voxels with a fluid which has an index of refraction similar to that of the clear voxels. If more than one color is desired in a display, individual voxels may contain different dyes or combinations of dyes to provide the different colors. Further, the voxels may be distributed throughout the array such that particular colors are present at desired locations in the array. Moreover, combinations or patterns of different color voxels may be positioned by design. For example, red, blue and green voxels may be grouped together and their energizations synchronized to form various colors in the visible spectrum.

Energy may be supplied to the voxels in various ways. In the case of voxels operating on light, for example, optical fibers preferably connect the voxels individually to suitable light sources or to a common light source. When employing a common light source, a suitable shutter or valve may be positioned in the light path to each voxel to control the flow of energy to the individual voxels. Operation of the shutters or valves, in turn, may be controlled by computer. Alternatively, a spatial light modulater may be used for this task.

The individual energy paths are preferably isolated from each other to reduce or prevent cross-talk. Thus, optical fibers or other suitable wave guides may be employed to improve channeling of energy to the voxels.

A voxel of the invention may be prepared by attaching one end of a suitable energy wave guide to the voxel. This may be done by matching optically flat surfaces or by forming the voxel integrally with the wave guide. Thus, for example, a length of synthetic resin or other suitable clear material may be heated at one end to form a voxel thereon.

The voxels of the invention are typically the smallest elements in an optical display system (except for the optical fibers, the diameter of which should be much smaller than the diameter of the voxels), wherein the elements are substantially transparent and display colored light, preferably one or more bands in the visible spectrum, in response to electromagnetic energy.

In practicing the present invention, the images typically will be formed based on data stored in a computer. The computerized data is utilized to instruct the three-dimensional monitor system which voxels are to be activated at any given time. While the system is capable of making a simple, two-dimensional display by activating only voxels in a single plane, its principal advantage lies in its ability to activate voxels lying in different planes, as well as voxels in common planes. The transparent nature of the voxels thus enables an observer to view displays which are truly three-dimensional in their appearance. Further, the display is capable of changing with time by activating and de-activating different voxels at different times to provide, for example, three-dimensional animation.

BRIEF DESCRIPTION OF THE DRAWINGS

The present invention and its features and advantages, herein described or otherwise apparent, may be better understood by reference to the following description in conjunction with the appended drawings, which drawings form a part of this specification. It is to be noted, however, that the appended drawings illustrate only exemplary embodiments of the invention and are therefore not to be considered limiting of its scope.

DETAILED DESCRIPTION OF A PREFERRED EMBODIMENT

In general, the monitor of the present invention utilizes a three-dimensional stack of voxels, a voxel array. The term voxel, or volume element, has been previously used to represent a volume of three-dimensional data stored by computer algorithms. As used herein, a voxel is a physical element similar to a pixel or picture element, except that instead of being a fundamentally two-dimensional element, as is a pixel, a voxel is a physical three-dimensional element. When multiple voxels are stacked in three-dimensions, a monitor with a true three-dimensional fabric becomes possible. By filling the interstices of a three-dimensional voxel matrix with an index of refraction matching fluid, a monitor which is substantially transparent and colorless in its off state may be constructed. The index matching fluid is chosen to substantially eliminate refraction and reflection of light at the interfaces between the voxels and the fluid.

Each voxel may be individually addressed so that it may be set in either an on or an off state. When a voxel is off it is substantially transparent. When addressed, the voxel becomes optically active by either emitting light or absorbing light. Thus, a three-dimensional pattern may be built up from a set of activated voxels. In a preferred embodiment, the voxels are stacked in a hexahedral solid or cubic shape in order to minimize distortions. Any desired shape, however, such as a sphere or a polyhedron may be implemented. The particular shape of individual voxels may also vary depending on resolution and packing density requirements as discussed below.

In a preferred embodiment, the voxels are stacked inside of a substantially transparent container, which will contain the index-matching fluid. Groups of voxels may be fused into modules to facilitate construction and repair of a monitor according to this invention.

Figure 1:
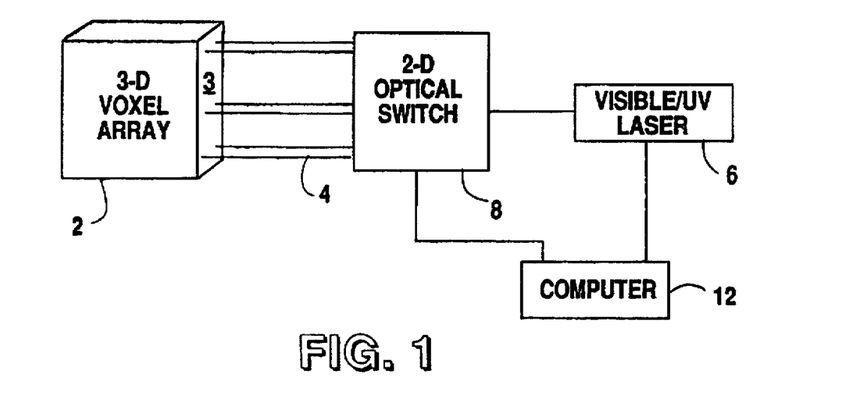
FIG. 1 is a block diagram of a three-dimensional monitor in accordance with the present invention.

FIG. 1 shows a general overview of an embodiment of a three-dimensional monitor system according to the present invention. Voxel array 2 is comprised of a three-dimensional array of individual voxels. Each voxel is connected to the end of a transmitting conductor, which may be an optical fiber 4. The individual voxels are addressed and activated by transmitting energy (for example, visible or ultraviolet light) from energy source 6 through switching network 8 and optical fiber 4 to each voxel. Energy source 6 may, for example, be a visible or ultraviolet laser or other electromagnetic energy source. It will be recognized that suitable electromagnetic energy sources other than light sources, and transmitting mediums other than fiber optics, may be used. For example, an electrical conductor can be coupled to each voxel, and the voxel (for example, a crystal containing a light-emitting junction) activated by supplying electrical energy via the conductor. Alternatively, the energy source may comprise an external focused source of electromagnetic radiation, which can be focused upon individual voxels in order to activate them.

Figure 2:
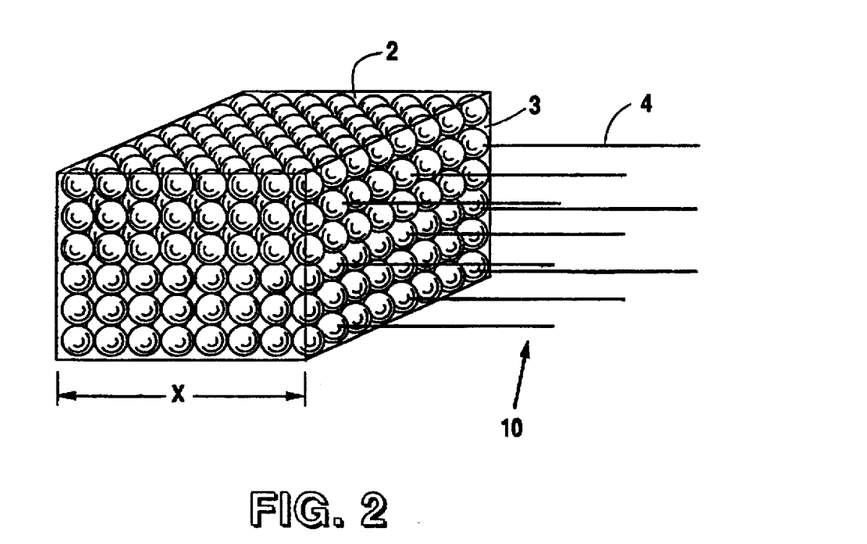
FIG. 2 is a perspective view of a three-dimensional array of voxels in accordance with the present invention.

FIG. 2 shows a magnified view of a portion of voxel array 2 showing the individual voxels arranged in three dimensions to create a three dimensional voxel array. Voxel array 2 would typically comprise many more voxels than are shown in FIG. 2, which is illustrative only. Fiber optic bundle 10 typically comprises one optical fiber 4 corresponding to (and coupled to) each voxel in voxel array 2. While FIG. 2 shows the voxels in a cubic packed configuration, the invention is not to be limited to such a configuration, and other voxel placement geometries may be utilized in this invention. In preferred embodiments, the individual voxels within the array are substantially invisible when surrounded by index matching fluid, as is discussed below. In a preferred embodiment, the transmitting conductors are optical fibers 4, collectively comprising optical fiber bundle 10. Optical fiber bundle 10 couples voxel array 2 to switching network 8.

Figure 2A:
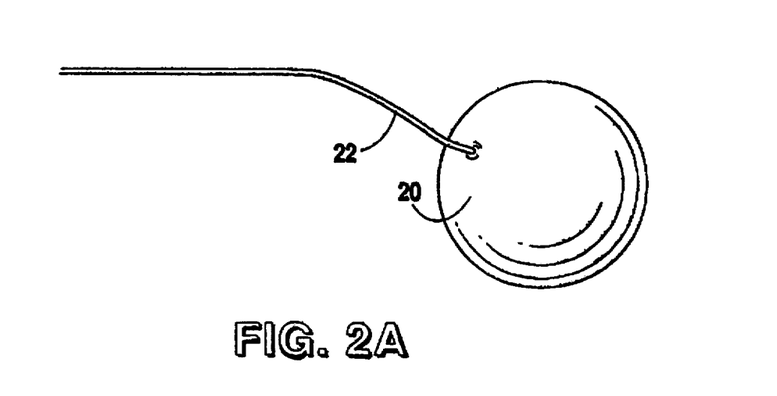
FIG. 2A illustrates an individual voxel coupled to the end of an optical fiber.

In a presently preferred embodiment a voxel of the present invention may comprise a nugget of polymethylmethacrylate (PMMA) or plexiglass, doped with an organic dye. Alternate materials, such as glass, doped glass, or crystals may, for some applications, be used to construct voxels. FIG. 2A shows voxel 20, composed of a dye-doped nugget of PMMA, that is connected to optical fiber 22. When addressed with optical energy through the optical fiber, the embedded dye fluoresces at a color that depends on the choice of dye. Many factors determine the optimum material used for the voxels. The importance of some of these factors may depend on the ultimate application for the monitor. Ideally, when not activated, a voxel should be invisible or totally transparent. However, this requirement may be relaxed if the activated voxels are strongly emitting. The overall voxel matrix should not distort the emission from a single voxel. The choice of voxels preferably should support color capability, at least on a red-green-blue level, and each activated voxel should be readable from a wide field of view. Voxel efficiency, power consumption, weight, and durability are also factors to consider when designing a monitor according to the present invention for a particular application.

In one embodiment, voxel 20 is made from PMMA powder with an average molecular weight of 120,000 dissolved in dichloromethane. A fluorescing dye is-added to this solution, and is evenly distributed among the PMMA molecules. The solution is then reduced to a solid film through accelerated evaporation. The solid film is next ground into a fine powder and placed in an aluminum mold. In the molding process, the powder is heated above its glass temperature, 114° C., but below its melting temperature, 180° C., under pressure of approximately 10,000 psi in a thermal hydraulic press, such as a Carver Model 5200 press. Alternative plastic molding processes may also be used. During the molding process one end of an optical fiber is sealed into the voxel.

Alternatively, a voxel may be formed from a plastic or fused silica optical fiber by heating one end of the material. This causes the waveguiding cladding to disperse and a spherical or near spherical bead to form at the heated end of the fiber. In operation, light energy is guided through the unaltered fiber and scatters out from the voxel. In this voxel embodiment, there may be no fluorescing dye in the voxel, and light that is conducted through the optical fiber is merely scattered from the bead formed at the end of the fiber. The light that scatters from such a voxel will correspond to the color of the light introduced into the optical fiber. In another embodiment, the voxel starting material may be doped with a fluorescing dye, producing a fluorescing voxel instead of a scattering voxel. Alternatively, a pigtailed voxel may be formed by starting from a plastic or glass bead (either doped or not doped with a fluorescing dye) and drawing out a fiber extension using heat and mechanical tension. This filament may be coated with a thin film of material having a slightly lower index of refraction in order to induce a waveguiding property.

Figure 3A:
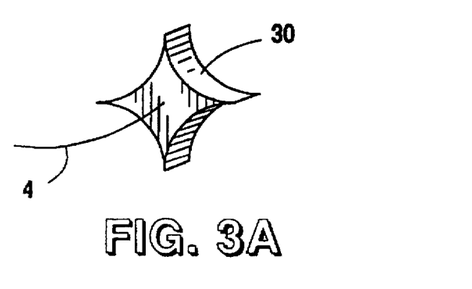
FIGS. 3A-3C illustrate exemplary alternative voxel shapes.
Figure 3B:
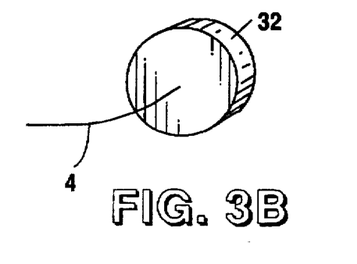
Figure 3C:
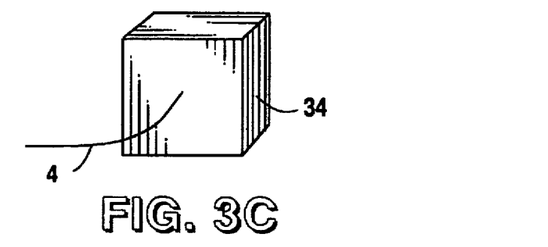

Voxels may be cast into any desired shape and size, including spheres, cones, and hemispheres, of different sizes, from under 1 mm to cover 1 cm in diameter. For illustrative purposes, FIGS. 3A–3C display some of the possible shapes of voxels 30, 32, and 34. For some applications where large voxels are useful, a hollow voxel may be utilized. The particular shape of the individual voxel should be designed for optimum viewing and packing within the voxel array and may vary depending on the specific application.

Figure 4A:
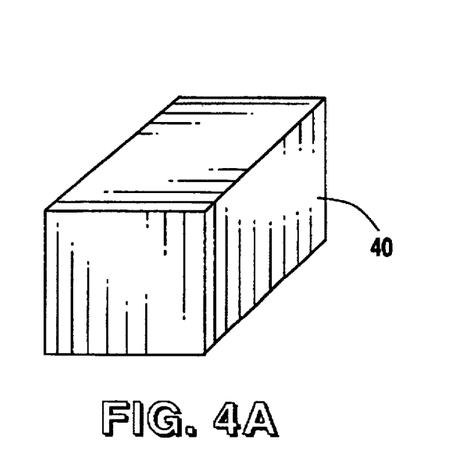
FIGS. 4A-4C illustrate exemplary alternative three-dimensional voxel array shapes.
Figure 4B:
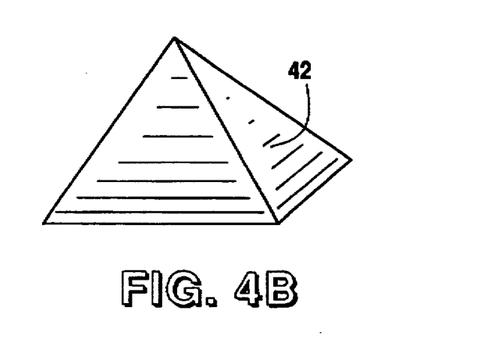
Figure 4C:
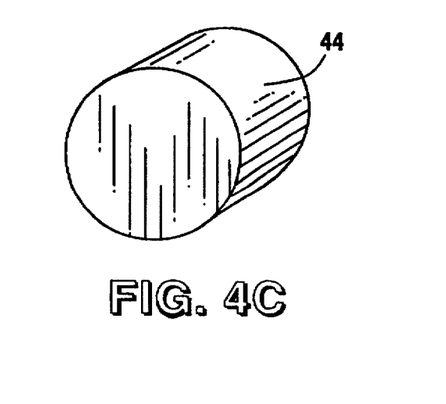

Multiple voxels are arranged to create a three dimensional voxel array. The shape of the voxel array may vary depending on the application. For example, a voxel array may be cubic, rectangular, pyramidal, spheroidal, or barrel shaped. Further, the shape of the overall array of voxels is independent of the shape chosen for each individual voxel. FIGS. 4A–4C illustrate examples of possible shapes of voxel arrays 40, 42, and 44.

Figure 6:
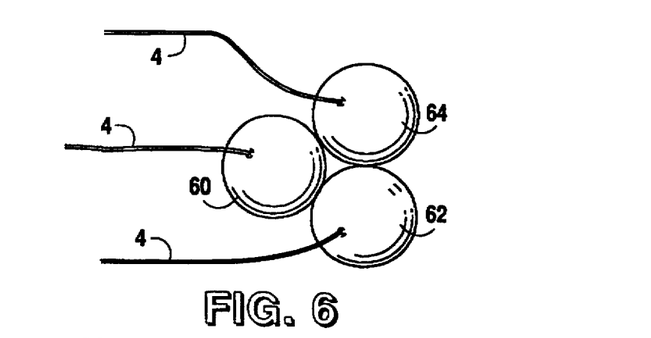
FIG. 6 illustrates a cluster of colored voxels that may be employed to provide a three-dimensional color monitor according to the present invention.

A variety of different dyes may be used in the voxels, including, as examples, α-NPO (2-(-naphthalenyl)-5-phenyl-oxazole), stilbene 420 (2,2'-({1,1'-biphenyl}-4, 4'diyldi-2, 1-ethenediyl)bis-benzene sulfonic acid disodium salt), or POPOP (2,2'-(1,4-phenylene)bis{5-phenyloxazole}). Energy conducted down the addressing optical fiber causes the dye within a voxel to fluoresce with a particular visible color that depends on the dye. For color applications, red dye voxel 60, green dye voxel 62 and blue dye voxel 64 may be clustered together as shown in FIG. 6. The luminance of each voxel in the cluster may be controlled to provide the full range of color hues. The choice of red, green, and blue dyes may be tailored to match the response curve of the erythrolabe (R) chlorolabe (G) and cyanolabe (B) cones that govern color vision in the human eye. In this way, any color, even white, may be metamerically constructed similarly to the way colors are constructed in a conventional color television. Controlling the relative amount of light pumped to each voxel controls the perceived color from the voxel cluster. The voxels of a cluster may be any desired shape, and the shape may be chosen to interlock the cluster together precisely and naturally.

Figure 5:
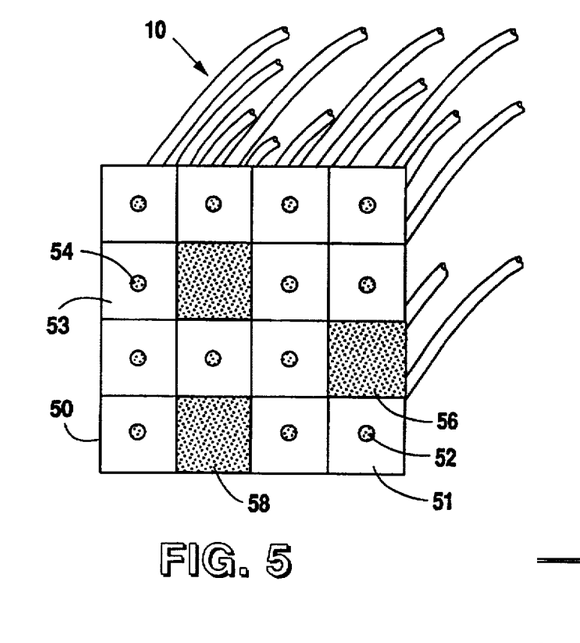
FIG. 5 is a diagrammatic illustration of a switching network in accordance with the present invention.

Specific voxels are selected for activation by switching network 8. The switching network 8, as well as other components of the three-dimensional monitor system may be controlled by computer 12. Computer 12 may also operate as an interface through which information to be displayed may be input from an external source to the three dimensional monitor system. Switching network 8 provides a mechanism for selectively providing energy to each voxel either in an analog or digital manner. For example, as shown in FIG. 5, fiber optic bundle 10 may be cleaved flat and placed adjacent to a two dimensional switching or shutter array 50. Individual shutters may be in an open state, allowing light to pass into specific optical fibers (and thus to the attached voxels). Individual shutters may also be in a closed state, blocking light from passing into specific optical fibers. Shutters 51 and 53 represent open shutters allowing light to pass into corresponding optical fibers 52 and 54. Shutters 56 and 58, on the other hand, represent closed shutters blocking light from entering the corresponding optical fiber ends (not shown). Thus, the switching network selectively allows energy to pass to specific optical fibers and to activate the voxels attached to the optical fibers. Because of the large number of voxels, it is desirable to make each shutter element compact. It is also desirable to be able to operate the switch network in a parallel, rather than in a serial manner.

In one embodiment, a flat array of liquid crystals, similar to the display screen of a laptop computer, is used as shutter array 50. A liquid crystal is an electronically tuned waveplate in which an applied voltage orients an ensemble of macromolecules in a particular direction. The array of molecular dipoles, changes the state of polarization of a transmitted light wave and if the liquid crystal is used with one or two polarizers, it may be used to electronically attenuate or shutter light. Such liquid crystals are well known in the art. Alternatively, shutter array 50 may be a mechanical shutter array. Mechanical shutters may, for example, be controlled by solenoids. Alternatively, shutter array 50 may be a spatial light modulator.

The input light power is preferably spread evenly over the switching array. The voxels may be activated by energy in a wide range of the visible and ultraviolet spectrum. However, liquid crystals and fiber optics become less transparent at short wavelengths. A preferable wavelength, for example, is approximately 300–400 nm. A laser is not required for energy source 6, but it provides desirable qualities such as a controllable beam and a definite wavelength. In one embodiment, a nitrogen laser may be used, while alternatively, an ultraviolet argon ion laser may be used. The required input power of the light source is dependent on the size of the display, the voxel dye conversion efficiency, the fiber optic coupling efficiency and the liquid crystal efficiency.

Alternatively, rather than using a single energy source and a switching network, multiple discrete energy sources may be used. For example, an array of semiconductor lasers, such as vertical cavity semiconductor lasers, may be aligned to provide light to each fiber optic. These lasers may be selectively switched on and off (or operated in an analog manner) to drive the voxel array, or they may be used as light sources combined with a switching array as described above.

The power output of the three dimensional monitor should be selected to provide a comfortable luminance for the user. A comfortable luminance for a two dimensional computer monitor is typically 0.5–1 lm/sr cm$^2$ in photometric units, or in radiometric units, a radiance of approximately $10^{-3}$ W/sr cm$^2$. For applications similar to two dimensional computer monitors, the overall luminance of the present invention may be selected to provide a similar range of luminance. The human threshold perception intensity for a voxel is dependent on the size of the voxel, the wavelength of light and the observer's visual acuity. Within the range of typical user perception, luminance of individual voxels may be adjusted to achieve specific effects. For example, one's perception of the brightness of targets often depends upon the luminance of surrounding objects, more than upon the target's luminance. The effect of simultaneous brightness contrast may be used to overcome the hidden line removal problem common to many three dimensional visualization systems. The hidden line removal problem involves the elimination of images that would not in reality be visible from a particular direction of view. By manipulation of the relative intensities of the images and parts of images displayed in the monitor according to this invention, the visibility of background images that are blocked by foreground images can be reduced or eliminated. Further, exploiting this effect will also serve to create a textural sensation, which is useful in mimicking light reflected off surfaces. As for the size of each voxel, the resolution ability of the typical human eye suggests that, at a comfortable viewing distance from a monitor, a voxel diameter of, for example, approximately 20 to 50 um is appropriate.

In order to provide space for routing optical fibers to each voxel, the voxels typically do not occupy 100% of the monitor volume. The volume that is not occupied by voxels or by optical fibers may be filled with an index matching fluid in order to achieve good transparency. Otherwise, a finite fresnel reflection coefficient would exist due to the refractive index difference between the free space and the voxels. Thus, the void between the voxels is filled with an index matching fluid formulated to eliminate ghost images due to the fresnel reflections off the voxel surfaces. For example, the index of refraction of the PMMA voxels has been measured to be 1.492 at 589 nanometers. A suitable blended immersion liquid such as formula code 5090 is commercially available from RP Cargille Laboratories. A variety of other index matching materials may also be used. It is desirable that such materials be stable over time and that they not chemically affect the voxel and optical fiber. An index matching fluid may also be used to fill hollow voxels.

Various optical fibers may be used in accordance with the present invention. In a preferred embodiment, fused silica optical fibers are used because of their good ultraviolet wavelength transmission capabilities. In addition, fused silica optical fibers have small diameters relative to other optical fibers constructed from materials such as plastic. A smaller diameter optical fiber will allow the maximum number of voxels to be packed within a specific sized voxel array. To preserve a good coupling efficiency into the fiber, a small, multi-mode optical fiber with a core diameter of approximately 50 microns may be used. Other embodiments of the present invention, however, may utilize different fiber optic materials or sizes depending on the specific design requirements of the monitor application.

In one embodiment, shown in FIG. 2, the fiber optic bundle 10 exits the voxel array 2 from a single side of voxel array 2. The size limitation for the three dimensional voxel array is then a function of the size and shape of each voxel, the size of the optical fibers connected to each voxel and the packing density of the voxels. In a cubic voxel array as in FIG. 1, the area of plane 3, through which the fiber optics emerge, is not the limiting dimension of the voxel array, but rather the dimension X perpendicular to the exit plane 3 is limited because the fiber optics from all the voxels that extend in rows perpendicular to plane 3 must exit through plane 3. The maximum number of voxels that can be stacked perpendicular to plane 3 may be calculated by determining how many optical fibers can be conducted through the available empty area between adjacent voxels, and thus is a function of the size, shape, and packing arrangement of the voxels and optical fibers. Optical fibers can be routed to exit the voxel array from any or all sides if adequate transparency of the fibers can be obtained using index matching fluids, and the size of the monitor can be increased thereby for a given geometry of the array components. Alternatively, the size of the monitor can be increased by combining more than one voxel array, such as, for example, one voxel array stacked upon another voxel array.

The three dimensional monitor system of the present invention may be operated to allow interaction between the monitor and the user. Thus, a user may interact with the voxel array by using a pointer or mouse, much as a pointer or mouse may be used to select a pixel (or a character or region) on a conventional two dimensional monitor. The pointer may be either a two dimensional or three dimensional pointer. For example, a three dimensional pointer ball containing a gyroscope may be used. Once a voxel or region is interactively selected, the user may quantitatively determine its three dimensional coordinates and state, change its state, cut and paste, etc. In addition, a conventional two dimensional pointer may be used to interact with the two dimensional switching network to interact with specific voxels.

Figure 7:
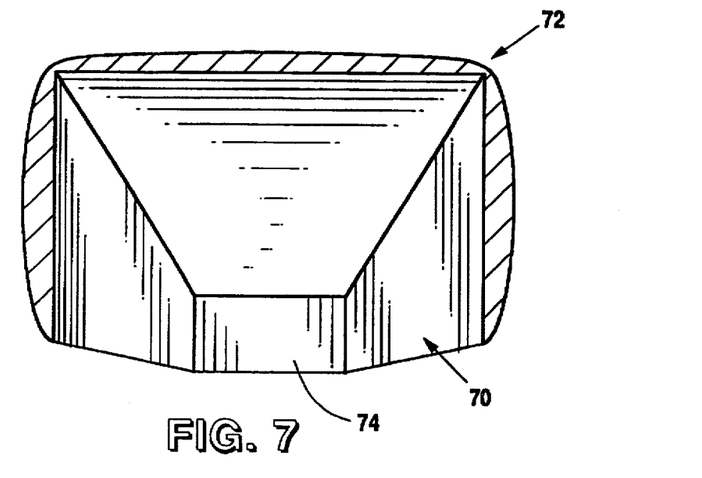
FIG. 7 illustrates the use of a three-dimensional monitor according to the present invention in conjunction with a conventional two-dimensional monitor.

The three dimensional monitor of the present invention may also be combined with conventional two dimensional monitors, such as cathode ray tubes and television displays, in any desired way. FIG. 7 illustrates one such combination. In an embodiment illustrated in FIG. 7, a three dimensional monitor 70 according to the present invention is placed adjacent to a flat or curved two dimensional display 72 and positioned between the user and two dimensional display 72. Three dimensional monitor 70 may be shaped to simulate the approximately 100×60 degree field of view of the human vision system. The viewer would view the combination of monitors through rectangular region 74. Such a combination of monitors may be utilized so that three dimensional monitor 70 provides true three dimensional images in the near field while the two dimensional screen 72 provides two-dimensional far field scenes. Another possible combination would comprise placing a three dimensional monitor next to an existing computer graphics/visualization system to provide an easy comparison of alternative presentations, two dimensional and three dimensional, of the same information. In yet another possible combination, the three dimensional monitor disclosed herein may be used as an erasable template for manufacturing systems such as computer aided model making that utilizes, for example, plastics and ink jet technologies.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A voxel, comprising a normally transparent, discrete volumetric display element adapted to emit light in response to stimulation by electromagnetic radiation.

2. The voxel of claim 1, further comprising a wave guide attached at one end to the display element.

3. The voxel of claim 1, wherein the display element comprises synthetic resin containing a dye which emits light in response to stimulation by electromagnetic radiation.

4. The voxel of claim 1, wherein said electromagnetic radiation is non-visible light.

5. The voxel of claim 1, wherein said electromagnetic radiation is ultraviolet light.

6. A monitor for displaying electronically generated images in three-dimensional space, comprising:
  a three-dimensional array of discrete volumetric optical voxels;
  a plurality of transmitting conductors, each transmitting conductor coupled to a respective voxel; and
  an energy source coupled to the transmitting conductors, adapted to provide energy that causes the voxels to emit visible light when the energy is conducted to them through the transmitting conductors.

7. The monitor of claim 6, further comprising a switching network coupled to the transmitting conductors and interposed between the energy source and the voxels, the switching network comprising switches for controlling the energy reaching the voxels.

8. The monitor of claim 6, further comprising an index of refraction matching material placed to occupy interstices between the voxels and the transmitting conductors within the voxel array.

9. The monitor of claim 6, wherein the voxels comprise polymethylmethacrylate doped with fluorescing dye.

10. The three dimensional monitor of claim 6, combined with a digital computer for selecting voxels to be activated and for selectively controlling the switches of the switching network accordingly.

11. The monitor of claim 6, combined with a two dimensional monitor placed behind the three-dimensional array, such that the two dimensional monitor is operable to display a two dimensional background image while the three dimensional array is operable to display a three dimensional foreground image.

12. A monitor for displaying electronically generated images in three-dimensional space, comprising:
  a three-dimensional voxel array, comprising a plurality of discrete volumetric light emitting voxels positioned within a three-dimensional volume;
  a plurality of optical fibers, each optical fiber coupled to a voxel; and
  a light source coupled to the optical fibers such that light can be selectively conducted through the optical fibers to the voxels.

13. The monitor of claim 12, further comprising an index of refraction matching material placed to occupy interstices between the voxels and optical fibers within the voxel array.

14. The monitor of claim 12, wherein the light source comprises a visible-light laser.

15. The monitor of claim 12, wherein the voxels comprise polymethylmethacrylate and a fluorescing dye.

16. The monitor of claim 12, wherein the light source comprises a separate laser for each voxel in the voxel array.

17. The three dimensional monitor of claim 12, combined with a digital computer for selecting voxels to be activated and for selectively controlling the switches of the switching network accordingly.

18. The monitor of claim 12, combined with a two dimensional monitor placed behind the three-dimensional array, whereby the two dimensional monitor is operable to display a two dimensional background image while the three dimensional array is operable to display a three dimensional foregound image.

19. A monitor for displaying an electronically generated image in a three-dimensional space, comprising:
  a three-dimensional voxel array comprising a plurality of discrete volumetric light emitting voxels positioned within a three-dimensional volume;
  a plurality of optical fibers, each optical fiber coupled to a respective voxel;
  a light source coupled to the optical fibers whereby light can be conducted into the optical fibers and transmitted to the voxels; and
  a switching network coupled to the optical fibers and interposed between the light source and the voxels, said network comprising a switch corresponding to each voxel and adapted to control an amount of light transmitted to such voxel.

20. The monitor claim 19, further comprising an index of refraction matching material places to occupy interstices between the voxels and optical fibers within the voxel array.

21. The monitor of claim 19, wherein the light source comprises a laser.

22. The monitor of claim 19, wherein the switching network comprises a liquid crystal array.

23. The monitor of claim 19, wherein the switching network comprises a mechanical shutter array.

24. The monitor of claim 19, wherein the voxels comprise polymethylmethacrylate doped with fluorescing dye.

25. The three dimensional monitor of claim 19, combined with a digital computer for selecting voxels to be activated and for selectively controlling the switches of the switching network accordingly.

26. The monitor of claim 19, combined with a two dimensional monitor placed behind the three-dimensional array, whereby the two dimensional monitor is operable to display a two dimensional background image while the three dimensional array is operable to display a three dimensional foreground image.

27. A monitor for displaying electronically generated images in three-dimensional space, comprising:

a three dimensional voxel array, comprising a plurality of discrete, light emitting voxels positioned within a three-dimensional volume, the voxels comprising beads of polymethylmethacrylate doped with fluorescing dye;

a plurality of optical fibers, each optical fiber coupled to a respective voxel;

an index matching fluid placed to occupy the interstices between the voxels and optical fibers within the voxel array;

a laser light source coupled to the optical fibers whereby light can be conducted into the optical fibers and thus transmitted to the voxels;

a liquid crystal switching network coupled to the optical fibers and interposed between the light source and the voxels, said network comprising a liquid crystal switch corresponding to each voxel, the switching network also adapted to control the amount of light transmitted to each voxel; and means for controlling the switches of the switching network so as to permit light to be transmitted to selected voxels.

28. A three dimensional monitor for displaying a computer generated image, comprising:

a three dimensional array of voxels, each voxel comprising a bead of resin doped with dye, the dye being chosen to emit visible light when stimulated with non-visible light energy;

a waveguide coupled to each voxel for transmitting non-visible light energy to the voxel;

a source of non-visible light energy; and switch means for controlling the transmission of non-visible light energy from the source of non-visible light energy to the voxels.

29. The monitor of claim 28, wherein the non-visible light energy is ultraviolet light.

30. The monitor of claim 28, wherein the switch means comprises a liquid crystal array.

31. The monitor of claim 28, further comprising an index matching substance filling the interstices between the voxels and the waveguides.

32. A method of producing a three dimensional image, comprising:

providing a three dimensional array of voxels, each voxel comprising a bead of resin doped with dye, the dye being chosen to emit visible light when stimulated with non-visible light energy; a waveguide coupled to each voxel for transmitting non-visible light energy to the voxel; a source of non-visible light energy; and switch means for controlling the transmission of non-visible light energy from the source of non-visible light energy to the voxels; and selectively operating the switch means to cause selected voxels to emit visible light to form a three dimensional image.

33. A method of presenting a three dimensional visible image, comprising:

providing a three dimensional voxel array comprising a plurality of discrete voxels for emitting light when stimulated by ultraviolet light energy, and a plurality of switches, each switch corresponding to one of said voxels, and an ultraviolet light source;

selecting a set of voxels to be activated to produce the desired visible image; and selectively operating the switches to enable light energy from the ultraviolet light source to pass through the selected switches to stimulate the selected set of voxels.

34. A method of presenting a three dimensional visible image, comprising:

providing a three dimensional monitor having a voxel array comprising a plurality of volumetric discrete voxels, and a respective plurality of selectable light sources, one of said light sources corresponding to each voxel;

selecting a set of voxels to be activated to produce the desired visible image; and selectively operating the light sources so as to activate the voxels corresponding to the selected light sources.

35. The method of claim 34, wherein the providing step comprises providing voxels including beads of resin doped with a dye that emits visible light when stimulated with light from said light sources.

36. A three-dimensional visual display system, comprising:

a three-dimensional array of normally substantially transparent optical display elements, each such element comprising a bead of resin doped with a dye that emits visible light when stimulated by light energy;

a plurality of optical waveguides coupled to the display elements for conducting light energy to the display elements;

a modulated light source coupled to each waveguide for selectively providing light to be conducted to the display elements; and an index matching medium substantially surrounding the display elements and the waveguides.

37. The system of claim 36, further comprising a digital computer for controlling the modulated light source.

38. The system of claim 36, wherein the modulated light source comprises a single light source and means for selectively distributing light to each of the optical waveguides.

39. The system of claim 36, wherein the modulated light source comprises a plurality of light sources corresponding to the plurality of optical waveguides.

40. A voxel assembly for use in a three-dimensional visual display, comprising:

a normally transparent volumetric display element adapted to emit light in response to stimulation by a preselected form of electromagnetic radiation;

a waveguide coupled to said display element for directing said electromagnetic radiation to the display element; and a switchable source of said electromagnetic radiation coupled to the wave guide.

41. The voxel assembly of claim 40, wherein the display element comprises synthetic resin containing a dye which changes color in response to stimulation by the electromagnetic radiation.

42. The voxel assembly of claim 41, wherein the preselected form of electromagnetic radiation is ultraviolet light, and wherein the dye is selected to fluoresce with a selected color when stimulated.

* * * * *

UNITED STATES PATENT AND TRADEMARK OFFICE
CERTIFICATE OF CORRECTION

PATENT NO.    :    5,801,666

DATED         :    September 1, 1998

INVENTOR(S)   :    Duncan L. MacFarlane

It is certified that error appears in the above-identified patent and that said Letters Patent is hereby corrected as shown below:

In claim 20, column 10, line 56, delete "places" and insert --placed-- therefor.

Signed and Sealed this

Fifteenth Day of December, 1998

Attest:

BRUCE LEHMAN

Attesting Officer

Commissioner of Patents and Trademarks